United States Patent Office 2,765,228
Patented Oct. 2, 1956

2,765,228

CELLULOSIC FIBROUS PRODUCTS AND METHODS OF PRODUCING THEM

Arthur D. Jordan, Jr., Moorestown, N. J., assignor to Rohm & Haas Company, Philadelphia, Pa., a corporation of Delaware No Drawing. Application March 3, 1955, Serial No. 492,041

19 Claims. (Cl. 92—3)

This invention relates to improved fibrous products containing synthetic linear resins which are characterized by increased dry strengths, particularly increased dry burst, tear, and tensile strengths. It is particularly concerned with the production of resin-containing fibrous products, such as papers, felts, or other molded fibrous products having increased dry strengths and methods of producing them.

In the past, various materials have been applied to fibrous products, especially to aqueous dispersions of paper-making or felt-making fibers prior to the wet laying of such dispersions for the purpose of improving the dry strengths thereof. For example, latices of polychloroprene have been introduced into fiber dispersions, such as in the beater, and the paper or other fibrous products obtained have been characterized by improved dry strengths. However, the application of this type of material also increases the wet strength so that it prevents "broke" recovery. This characteristic may be an advantage where wet strength is desired. However, in many cases, such as in the case of papers or felts intended for use in such applications as backing for flooring or roofing materials where the sheeted product is subsequently coated or impregnated, high wet strength is unnecessary and the prevention of "broke" recovery because of such wet strength is undesirable.

It has now been found that the introduction of relatively small amounts of water-soluble condensation products of lower alkylene oxides with a polymer of monoethylenically unsaturated monomer molecules comprising carboxyl-containing units are highly effective for the improvement of dry strengths of such fibrous products when they are anchored to the fibers forming the sheet by a poly-cationic high molecular weight organic flocculating agent previously adsorbed on the fibers. It has already been suggested that water-insoluble resins and the like can be effectively deposited on paper fibers by such poly-cationic agents for improving the strength of papers or the like made therefrom. However, to obtain substantial improvements in strength from such prior treatments, a comparatively large amount of the water-insoluble resin had to be applied, on the order of at least about 10% of the weight of the fiber.

In accordance with the present invention, it has been found that from 0.5 to 2% of the water-soluble condensates of the present invention impart strength improvements that ordinarily required 10% or more of the heretofore used water-insoluble materials. The use of the water-soluble condensates of the present invention is accompanied by other economies as well, such as the fact that no emulsifier is needed for dispersing them in water. Also, wet strength is not increased excessively so that the condensates of the present invention do not interfere with broke recovery. While more than 2% of the condensates may be applied, such as up to 10% or 20% of the weight of dry fiber, the use of the higher amounts generally results in no greater benefit and frequently produces diminished returns.

By "water-soluble" herein is meant to refer to solubility of the type which results in colloidal solutions without the aid of a dispersing agent as well as true solubility.

The use of emulsifiers or emulsion stabilizing agents of anionic character has the disadvantage that whenever polyvalent metal ions come into contact with the dispersions, whether by accident or otherwise, the dispersions become unstable and the resin is deposited as flocs or adhesive masses in the pipe lines and tanks which serve for storing and conveying such dispersions.

It is an object of the present invention to provide modified synthetic linear resins which are flocculated and anchored by the direct action of groups in the polymer upon the poly-cationic flocculating material. In this system, the cationic member not only flocculates the resin but serves to anchor it to the fiber by the formation of a direct bond between the poly-cationic anchoring member and the resin, and by the affinity of the poly-cationic material with the fiber, especially when the fiber is of cellulosic character. Other objects and advantages will be apparent from the description hereinafter.

In accordance with the present invention, the fibrous material is first treated with a poly-cationic high molecular weight organic nitrogen compound and then a water-soluble lower alkylene oxide condensate of a synthetic linear polymer comprising carboxyl groups or salts thereof such as those of ammonium hydroxide or the alkali metals, such as sodium and potassium or the like, is applied in the form of an aqueous solution formed without the aid of dispersing agents.

One or more of the cationic nitrogen atoms of the poly-cationic nitrogen compound, being positive in character, is believed to be adsorbed by the cellulosic fiber of negative character, and another or others of the cationic nitrogen atoms is believed to combine with a carboxyl group or possibly a hydroxyl group of the linear polymer so as not only to precipitate the polymer, but also by virtue of the affinity between the fiber and poly-cationic and between poly-cationic and resin, to anchor the resin to the fiber. When the poly-cationic contains more than two cationic nitrogen atoms, several such atoms may be attracted to the groups on one or more cellulose molecules, and other cationic nitrogen atoms may be attracted to the carboxyl groups of one or more resin molecules. It has been found that the retention of the resin effected by this bonding or anchoring action is substantially stoichiometric. This results in thorough distribution of the resin among the fibers and prevents irregular "grape bunch" deposition.

One type of poly-cationic compounds that may be used for carrying out the invention are water-soluble sub-resinous to resinous condensation products, having a moleuclar weight or average molecular weight of 500 to 10,000 or higher, preferably 600 to 3,000, of polyalkylene-polyamines with poly-functional aliphatic dihalides or halohydrins which may or may not be further reacted with urea or with primary urea-formaldehyde condensation products, such as dimethylolurea, the final product being in any event water-soluble. Examples of poly-functional aliphatic compounds are ethylenedichloride, alphadichlorohydrin, dibromohydrin, di-iodohydrin, epi-chlorohydrin, epibromohydrin, epi-iodohydrin, diepi-iodohydrin. The alkylenepolyamines used in preparing the poly-cationic reaction products employed in practicing our invention are well-known compounds corresponding to the formula $H_2N(C_nH_{2n}.HN)_xH$ in which $x$ is one or more. Typical amines of this class are the alkylenediamines such as ethylenediamine and 1,3-propylenediamine and polyalkylenepolyamines such as diethylenetriamine, triethylenetetramine, tetraethylenepentamine and the corresponding poly-propylenepolyamines and polybutylene-polyamines. The halohydrins are derivatives of glycerol in which one terminal hydroxy group is substituted by a halogen atom; i. e., by chlorine, bromine and the like. It has been found that the products which they form by reaction with alkylenepolyamines contain quaternary ammonium groups, and this is probably the reason why these products are substantive to cellulose fibers.

The poly-cationic products of this type may be those disclosed in Yost and Auten U. S. Patent 2,616,874. As disclosed therein, they may be prepared by reacting one mole of a polyamine, and preferably an alkylenepolyamine such as ethylenediamine or a polyalkylenepolyamine such as diethylenetriamine or tetraethylenepentamine with 1 to 3 moles, preferably 1 to 1.6 moles, of a polyfunctional halohydrin or aliphatic dihalide, such as ethylene dichloride depending upon the particular polyamine. When the higher proportions of the polyfunctional halohydrin or aliphatic dihalide are used, from 1.3 to 2 moles per mole of polyamine, the reaction should be carried out in two, three or more steps or stages with only a part of the halohydrin or dihalide present in each stage. Between stages, the hydrogen halide is preferably neutralized by a base, e. g. sodium hydroxide or sodium carbonate. This reaction is preferably carried out in an aqueous, alcoholic, or aqueous alcoholic solution at temperatures below the boiling point of the mixture, usually about 50° to 70° C. when a halohydrin is employed, or at temperatures of about 60° to 150° C. when an aliphatic dihalide is used, in order to permit the use of relatively concentrated solutions while obtaining the product in a hydrophilic or water-dilutable condition. Usually the halohydrin or dihalide is added slowly to the polyamine, which is preferably dissolved in water or a water-miscible solvent such as alcohol, at a rate such that the reaction temperature is maintained at the desired temperature.

When a thermosetting poly-cationic product of this type is desired, the reaction product of the polyamine with the halohydrin, the alkylene dichloride or the like, after the initial exothermic reaction, may be maintained at 60° to 70° C. until an increase in viscosity is noted, indicating that the second stage of the resin-forming reaction has set in, after which it is cooled and diluted with water if necessary to form a stable syrup. In some cases, and particularly where a dihalohydrin is being used, sufficient alkali such as sodium hydroxide, sodium or potassium carbonate, or sodium or potassium phosphate may be added before or during the second stage of the reaction to neutralize the syrup by combining with any hydrohalide that is not taken up by the polyamine. This alkali addition also frequently gives improved results when condensing a polyamine of relatively low molecular weight, such as ethylenediamine, diethylenetriamine, or triethylenetetramine with several molecular proportions of a monohalohydrin such as epichlorohydrin in the preparation of a thermosetting resin. If desired, the syrup may be subjected to a vacuum distillation after the first stage of the reaction is completed to remove any unreacted epichlorohydrin, dichlorohydrin or other polyfunctional halohydrin.

Another thermosetting type may be prepared by reacting the condensation product of the polyamine and a halohydrin or aliphatic dihalide with urea. For example, triethylenetetramine (1 mole) is condensed with ethylene dichloride (1 mole) and the resulting product is further condensed with 0.6 mole of additional ethylene dichloride. The resulting product, after removal of water, is condensed with 0.2 to 1.5 mole of urea per —NH— group available for reaction by fusion at 100–200° C., the preferred range being 120–150° C. until a solution viscosity of B—M is obtained (Gardner-Holdt on a 50% aqueous solution). The resulting condensate may be used as such or, if desired, it may be reacted further with formaldehyde, for example, using 0.6 to 1.5 mole of formaldehyde per hydrogen on nitrogen atom as determined by calculation from the amounts of polyethylenepolyamine and urea used. In this calculation it is assumed that each unreacted —NH— group provides one hydrogen and that each reacted mole of urea provides 2 hydrogens.

Another poly-cationic material that may be used is polyethyleneimine which always contains cationic groups either as positively charged ammonium salt groups

or as quaternary ammonium groups.

The poly-cationic compounds that may be used include the polymers or copolymers of styrene, vinyltoluene, or the cumarone-indene class which have been chloroalkylated, such as chloroethylated or chloromethylated, to introduce one chloroalkyl group, such as a chloroethyl or chloromethyl group for each 1 to 5 monomeric units in the polymer, and subsequently quaternized by heating with a tertiary amine such as trimethylamine, triethanolamine, dihexylmethylamine, benzyldimethylamine, pyridine, triethylamine, phenyldimethylamine, and so on. The compounds of this group are particularly valuable because they can be derived from resinous materials of initial low cost, of which the resins of the cumarone-indene class are especially important, and they can be represented generally by the following structural formula:

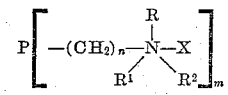

where P is the residue of the polymer or copolymer of the styrene, vinyl toluene and cumarone-indene class, $n$ is an integer having values of 1 to 4 or more but preferably no more than 2, $m$ has such a value in the preferred group that the compound contains at least one quaternary ammonium group per 1 to 5 monomeric units in the residue P, X is OH, or a negative, salt-forming radical, such as chlorine, R, $R^1$ and $R^2$ are each selected individually from the class consisting of aliphatic (e. g., methyl, ethyl), alicyclic (e. g., cyclohexyl), aryl (e. g., phenyl), arylaliphatic (e. g., benzyl), and heterocyclic groups, except that at least two of R, $R^1$ and $R^2$ may together constitute with the N atom a heterocyclic group. The quaternized polymers of the cumarone-indene class are disclosed and claimed in the application of Earl W. Lane, Serial No. 410,431, filed on February 15, 1954 and in the hands of a common assignee.

A preferred group of flocculants because of their colorless character and their high efficiency are the water-soluble linear polymers (and their quaternaries) of at least 10 mole percent, and preferably at least 50 mole percent (of the total polymerized units therein) of monomeric units having the Formula I:

I

where

R is H or $CH_3$

Y is O, COO, or CONH

A is —$C_2H_4$—, —$(CH_2)_3$—, or —$CH_2CH(CH_3)$—

R' is H, $CH_3$ or $C_2H_5$ and $R^2$ is H, $CH_3$ or $C_2H_5$

The molecular weights may be from 20 to 20,000 monomeric units or even higher. The preferred polymers of this group are those in which Y is COO, R is $CH_3$, A is —$C_2H_4$—, R' and $R^2$ are both methyl groups, and the molecular weight is at least about 100,000 or higher.

The quaternaries of this preferred group of the compounds may be those obtained by quaternization with a lower alkylene oxide, such as ethylene oxide or propylene oxide, or any alkylating agent, such as benzyl chloride, methyl chloride, methyl sulfate.

Any of the water-soluble polymeric amines, or quaternaries thereof, that are disclosed in the copending applications in the hands of a common assignee, Serial No. 441,643, filed July 6, 1954; Serial No. 461,285, filed October 8, 1954; and Serial No. 467,872, filed November 9, 1954, may be employed as the poly-cationic anchoring agent for the water-soluble alkylene oxide condensates used in the present invention. Representative examples include: homopolymers (and copolymers of at least 10 mole percent) of 3-dimethylaminopropyl acrylate, methacrylate, acrylamide or methacrylamide, quaternized with ethylene oxide or propylene oxide, methyl chloride, benzyl chloride or the like; corresponding polymers of dimethylaminoethyl acrylate, methacrylate, acrylamide, or methacrylamide quaternized with ethylene oxide or propylene oxide, methyl chloride, benzyl chloride or the like; and corresponding polymers of dimethylaminoethyl vinyl ether or of dimethylaminopropyl vinyl ether quaternized with ethylene oxide or propylene oxide, methyl chloride, benzyl chloride or the like.

The synthetic linear polymer that is to be anchored to the fibers of the products include the condensates of lower alkylene oxides with polymers of acrylic acid, methacrylic acid and itaconic acid, having average molecular weights of 1,000 to 300,000 or higher. Homopolymers of these acids and copolymers thereof containing at least 35 molar percent of one or more of these acids as the substituent monomer units may be condensed with the ethylene oxide, propylene oxide, or mixtures thereof. It is preferred to employ homopolymers or copolymers containing at least 50 mole percent of one or more of these acids so that the alkylene oxide condensates of the polymer are readily soluble in water.

Other polymerizable compounds containing a single vinylidene group that may be copolymerized with one or more of the acids above or with salts of such acids include the following esters of acrylic acid or methacrylic acid and monohydric alcohols such as methyl, ethyl, butyl, octyl, dodecyl, cyclohexyl, cyanoethyl, aminoethyl, and the like; esters of itaconic acid and the above alcohols; esters from maleic, fumaric or citraconic acids, and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, vinylidene fluoride, vinylidene cyanide, 1-chloro-1-fluoroethylene, ethylene, styrene, 2-vinylpyridine, 4-vinylpyridine, 2-methyl-5-vinylpyridine, and styrene.

The carboxyl-containing polymer that is to be condensed with alkylene oxide may be made by dissolving a free radical initiator, such as ammonium or an alkali metal persulfate in water, heating to about 85° to 100° C., then gradually adding the monomeric acid or the mixture of monomers containing at least about 35 mole percent of the monomeric acid while maintaining the temperature in the above range and refluxing any monomer vapor. The initiator is used in an amount of about 0.5 to 3% on the weight of monomers. It may be added in portions at intervals instead of all at once as previously mentioned.

The aqueous solution of the linear polymer thereby obtained and containing free —COOH groups is then reacted with the alkylene oxide. If desired, a small amount of an acid such as hydrochloric or sulfuric acid or a small amount of an alkaline material, such as NaOH, KOH, or NH$_4$OH may be added to accelerate the reaction but such additions are unnecessary. The reaction may be effected at room temperature to about 60° C. in about 1 to 4 hours. When ethylene oxide is used, a closed pressure vessel is convenient for the reaction, the oxide being introduced continuously or in successive portions as desired. The proportion of alkylene oxide introduced may vary from 1 mole percent of the carboxyl-containing units of the polymer to 250 mole percent thereof. Preferably the amount of alkylene oxide reacted with the polymer is equivalent to 10 mole percent to 95 mole percent of the carboxyl-containing units of the polymer.

Particularly valuable resin condensates are obtained from a copolymer of a mixture of (a) one or more monomeric esters of acrylic and/or methacrylic acid and (b) at least 35 mole percent, and preferably 50 to 100 mole percent of, monomeric acrylic, methacrylic and itaconic acid or mixtures of these acids. The monomeric esters of acrylic and methacrylic acids, which have proven to be most satisfactory, are the alkyl esters in which the alkyl group contains one to eight carbon atoms and which are exemplified by the following: methyl, ethyl, n-propyl, isopropyl, n-butyl, isobutyl, sec-butyl, tert-butyl, isoamyl, tert-amyl, hexyl, heptyl, n-octyl, and 2-ethylhexyl acrylates and methacrylates and isomers of these.

The two-stage treating process of the present invention may be applied to formed fiber products even after drying thereof, but preferably before such drying. Whenever the product-forming operation involves the handling of a fiber dispersion or suspension, it is preferable to apply the treatment to the fibers while in such a suspension. Thus, in paper-forming operations, it is preferred to apply the two-stage treatment to the aqueous dispersion of the fibers, such as in the beater, at the Jordan, in the fan pump, in the stuffbox or in the headbox or in any conduit or channel through which the fiber suspension must pass in proceeding from one to another of the devices mentioned. The two-stage treatment may be applied to fiber dispersions of any consistency, especially including those containing 0.5 to 6% of fiber in conventional paper-making practice. If desired, after introduction of the poly-cationic compound and the resin, the fiber dispersion may be diluted to lower concentrations such as to 0.001 to 0.5% in preparation for the sheeting operation which may take place on any suitable equipment, such as on the wire of a conventional Fourdrinier paper machine.

The condensate in preferred instances contains residual free carboxyl groups uncombined with alkylene oxide. Such preferred condensates may be applied to the paper fibers either as the free acid or in the form of watersoluble salts such as of ammonium or of the alkali metals.

The amount of alkylene oxide condensate deposited on the fibrous product may be from 0.5 to 2% by weight of the fiber. For most purposes, a proportion of about 1% condensate on this basis is preferred. For anchoring the condensate to the fiber, a proportion of 0.2 to 2% by weight of the fiber, of the poly-cationic nitrogen compound may be used. The ratio between the condensate and the cationic compound is in most cases about 1:1, such as from 7:10 to 10:7 but when the preferred group of flocculants (Formula I) are employed, the proportion of anchoring agent may be reduced to as low as one-fourth of the amount of condensate with good results. The pH during deposition, that is at the time of introduction of the condensate into the poly-cationic-compound-treated fiber, may be within the range of 4 to 9.5, but in most cases, it has been found that a range of 7 to 8.5 is quite suitable, and because of the non-acidity of this range, it is preferred. The pH may be controlled, not only at the point of deposition as defined hereinabove, but also throughout the subsequent handling of the treated fiber mass, particularly to the point of sheet formation or molding.

In the following examples, which are illustrative of the invention, the percent of anchoring agent and of condensate are based on the weight of the fiber; the strengths given are all based on a dry product conditioned over a period of at least twelve hours at 50% relative humidity at a temperature of about 75° F.; the burst strength (Mullen) is in lbs./sq. in.; the edge tear is in lbs.; the tensile strength is in pounds per square inch.

*Example 1*

To a bleached sulfite pulp having a consistency of 1% dry fiber and lightly beaten to a Canadian Standard freeness of 615 ml. there is added in an amount of 1% on the dry weight of pulp a cationic anchoring agent obtained by the condensation of diethylenetriamine with 1.88 moles of ethylenedichloride effected in three stages as follows:

In the first stage, diethylenetriamine (1 mole) was heated to about 105° C. and 0.7 mole of ethylenedichloride was added while the temperature was kept at 105° to 110° C. The mixture was heated to 120° C. and held at this temperature until the viscosity of a sample diluted with water in a ratio of 2:1 was between D and E (25° C.) on the Gardner-Holdt scale. The mixture was cooled, and 50% aqueous NaOH added to destroy hydrohalide. The mixture was then heated to 105° C. and 0.6 mole ethylenedichloride added while the temperature was kept between 105° and 110° C. The mixture was heated at 112° C. until the product had a viscosity of W to W+ (Gardner-Holdt). It was then cooled to 100° C., and hydrohalides neutralized by addition of 50% aqueous NaOH. The reaction mixture was again heated to 105° to 110° C. and 0.58 mole ethylenedichloride added over a 2.5 hour period. Following this, the mixture was heated at 112° C. under reflux until the viscosity of the mixture (salt first removed by centrifuging) was about X (Gardner-Holdt). The product was cooled and treated with 50% aqueous NaOH to liberate generated hydrohalide.

Then 1% of the reaction product of propylene oxide on polyacrylic acid (about 0.6 mole of the oxide per acid unit) having an average molecular weight of around 50,000 is added. The mixture is sheeted on the paper-making wire or screen and dried at about 200° F. in about 2 minutes. The paper had a weight of 40 lbs. per ream. The finished treated paper and a control sheet obtained in the same way but without the anchoring agent and polyacrylic acid derivative had the following properties.

| Paper | Dry Burst Strength | Dry Tensile Strength | Edge Tear Strength | MIT Fold No. |
|---|---|---|---|---|
| Treated | 24 | 16 | 4.0 | 57 |
| Control | 12 | 11 | 3.4 | 9 |

*Example 2*

The procedure of Example 1 was repeated with the same anchoring agent but the alkylene oxide condensate was replaced with the reaction product of polymethacrylic acid with about 50 mole percent of propylene oxide (that is 0.5 mole of propylene oxide per acid-containing unit of the polymer).

| Paper | Dry Burst Strength | Dry Tensile Strength | Edge Tear Strength | MIT Fold No. |
|---|---|---|---|---|
| Treated | 22 | 14 | 3.1 | 26 |
| Control | 9 | 8 | 2.5 | 4 |

*Example 3*

The procedure of Example 1 was followed except the water-soluble condensate was obtained by reacting a 1:1 molar ethyl acrylate: methacrylic acid copolymer with 0.6 mole of ethylene oxide per —COOH-containing polymer unit.

| Paper | Dry Burst Strength | Dry Tensile Strength | Edge Tear Strength | MIT Fold No. |
|---|---|---|---|---|
| Finished | 18 | 11 | 3.9 | 23 |
| Control | 8 | 7 | 2.8 | 3 |

*Example 4*

The procedure of Example 1 was followed except that the water-soluble alkylene oxide condensate used was replaced with the condensate obtained by reacting a copolymer of 40 mole percent of methyl methacrylate with 60 mole percent of methacrylic acid and 0.6 mole of propylene oxide per carboxyl-containing unit of the polymer.

| Paper | Dry Burst Strength | Dry Tensile Strength | Edge Tear Strength | MIT Fold No. |
|---|---|---|---|---|
| Finished | 21 | 11 | 4.3 | 30 |
| Control | 8 | 7 | 2.8 | 3 |

*Example 5*

The procedure of Example 1 was followed except that the water-soluble alkylene oxide condensate was replaced with the reaction product of a copolymer of 25 mole percent methyl acrylate with 75 mole percent of acrylic acid and 0.63 mole of propylene oxide per carboxyl-containing unit.

| Paper | Dry Burst Strength | Dry Tensile Strength | Edge Tear Strength | MIT Fold No. |
|---|---|---|---|---|
| Finished | 24 | 13 | 4.5 | 46 |
| Control | 8 | 7 | 2.8 | 3 |

*Example 6*

The procedure of Example 1 was repeated except that the water-soluble alkylene oxide condensate was replaced with the reaction product of a copolymer of 50 mole percent of ethyl acrylate with a mixture of 25 mole percent methacrylic acid with 25 mole percent of acrylic acid and 2.5 moles of propylene oxide per carboxyl-containing unit.

| Paper | Dry Burst Strength | Dry Tensile Strength | Edge Tear Strength | MIT Fold No. |
|---|---|---|---|---|
| Finished | 17 | 10 | 3.6 | 17 |
| Control | 8 | 7 | 2.8 | 3 |

*Example 7*

The procedure of Example 2 was repeated except that the anchoring agent and the water-soluble propylene oxide condensate were each used in amounts of 2% on the weight of the dry pulp.

| Paper | Dry Burst Strength | Dry Tensile Strength | Edge Tear Strength | MIT Fold No. |
|---|---|---|---|---|
| Finished | 28 | 19 | 3.0 | 114 |
| Control | 8 | 9 | 3.2 | 3 |

*Example 8*

The procedure of Example 1 was followed except that the water-soluble alkylene oxide condensate was replaced with 0.5 percent of a propylene oxide condensate with polymethacrylic acid in which 0.5 mole of propylene oxide was reacted for each carboxyl-containing unit and the anchoring agent was replaced with 0.5% of a homopolymer of dimethylaminoethyl methacrylate quaternized with ethylene oxide to the extent of about 85% of the amine-containing groups in the polymer. The molecular weight of the anchoring agent was on the order of 200,000 to 300,000.

| Paper | Dry Burst Strength | Dry Tensile Strength | Edge Tear Strength | MIT Fold No. |
|---|---|---|---|---|
| Finished | 24 | 16 | 3.0 | 70 |
| Control | 9 | 8 | 3.0 | 3 |

*Example 9*

To an unbleached kraft pulp having a consistency of 1% dry fiber and lightly beaten to a Canadian Standard freeness of 680 ml. there is added 1% on the dry weight of pulp of a homopolymer of dimethylaminoethyl methacrylate. Then 1% of the reaction product of polymethacrylic acid with 0.5 mole of propylene oxide per carboxyl-containing units of the polymer was added.

| Paper | Dry Burst Strength | Dry Tensile Strength | Edge Tear Strength | MIT Fold No. |
|---|---|---|---|---|
| Finished | 37 | 19 | 3.9 | 533 |
| Control | 13 | 11 | 4.0 | 9 |

*Example 10*

To a bleached sulfite pulp having a consistency of 1% dry fiber and lightly beaten to a Canadian Standard freeness of about 615 ml. there is added 0.25% by weight, on the weight of the dry pulp, of a polymer of dimethylaminoethyl methacrylate. Then there was added 1% by weight, on the weight of the dry fiber of the reaction product of polymethacrylic acid with 0.5 mole of propylene oxide per carboxyl unit of the polymer.

The treatment is adapted to improve the dry strengths of all types of fiber stocks, especially those of poor quality, such as of oak, poplar, and yellow birch, and those of extremely short fiber length, as well as those of long fiber length and of good quality derivation, such as from spruce and hemlock. Any fibrous cellulosic material (capable of adsorbing cationic polyamine/halohydrin resin from an aqueous solution thereof) may be coated or impregnated by the process of the invention. A wide variety of fibrous cellulosic material used in the preparation of paper, board, moulded resin fillers and the like may be used, such as kraft pulp, rag pulp, soda, sulfate, ground-wood, sulfite pulp and alpha pulp. Similarly, other forms of fibrous cellulose such as cotton linters, and the like may be employed. These materials may be used alone or in admixture with fibers from other sources, such as jute, hemp, sisal, strings, chopped canvas, and other material, either cellulosic or noncellulosic, that may improve the impact resistance, mechanical strength or other properties of the formed or moulded impregnated material.

The process of the present invention is adapted to produce papers and other fibrous products having increased strengths. The papers and felts obtained may be used for making paperboards, paper bags of the single wall or multi wall type, backings for flooring such as linoleum, roofing felts, waterproof or moisture-vaporproof paper, paper or board containers or cartons for milk, butter, foods, etc., resin-impregnated laminating paper, abrasives composed of resin-impregnated paper coated with abrasive particles, moulded articles, premoulded articles, electrical insulators, filter paper, heat-insulating paper, or loose masses of unfelted and unmoulded impregnated cellulose stock used for air filters, dust filters, heat-insulation and the like.

As pointed out above, the poly-cationic compound controls the distribution on deposition of the resin, assuring substantially uniform and thorough distribution while avoiding irregular, objectionable, "grape-bunch" effects that would occur with alum or the like. In addition, the condensates are anchored by direct affinity between carboxyl and/or hydroxyl groups therein and the cationic nuclei in the anchoring agent which, in turn, is anchored to the cellulosic fibers by other cationic nuclei. The adsorption or affinity of the condensate relative to the anchor minimizes the amount of resin lost in the "white water" drained during sheet operations. The condensates of the present invention also impart no appreciable increase in wet strength, which allows recovery of "broke."

It is to be understood that changes and variations may be made without departing from the spirit and scope of the invention as defined in the appended claims.

I claim:

1. As a new article of manufacture, a fibrous product containing cellulosic fibers and comprising (a) a water-soluble condensate of a polymer of monoethylenically unsaturated monomeric molecules comprising at least 35 mole percent of an acid of the group consisting of acrylic acid, methacrylic acid, and itaconic acid with 1 mole percent to 250 mole percent of at least one alkylene oxide selected from ethylene oxide and propylene oxide, and (b) a poly-cationic substance selected from the group consisting of sub-resinous to resinous condensation products of, and polymers of, an organic nitrogen compound anchoring the condensate to the fibers of the product, the ratio of the condensate to the anchoring compound being from 4:1 to 10:7.

2. As a new article of manufacture, a fibrous product containing cellulosic fibers and comprising (a) a water-soluble condensate of a polymer of monoethylenically unsaturated monomeric molecules comprising at least 35 mole percent of an acid of the group consisting of acrylic acid, methacrylic acid, and itaconic acid with 10 mole percent to 95 mole percent of at least one alkylene oxide selected from ethylene oxide and propylene oxide, and (b) a poly-cationic substance selected from the group consisting of sub-resinous to resinous condensation products of, and polymers of, an organic nitrogen compound anchoring the condensate to the fibers of the product, the ratio of the condensate to the anchoring compound being from 4:1 to 10:7.

3. As a new article of manufacture, a paper-like fibrous product containing cellulosic fibers and comprising (a) 0.5 to 2% by weight, on the weight of the fibers, of an alkylene oxide water-soluble condensate of a polymer of monoethylenically unsaturated monomeric molecules comprising at least 50 mole percent of an acid of the group consisting of acrylic acid, methacrylic acid, and itaconic acid with 1 mole percent to 250 mole percent of at least one alkylene oxide selected from ethylene oxide and propylene oxide, and (b) 0.2 to 2% by weight, on the fiber weight, of a poly-cationic substance selected from the group consisting of sub-resinous to resinous condensation products of, and polymers of, an organic nitrogen compound anchoring the condensate to the fibers of the product, the ratio of the condensate to the anchoring compound being from 4:1 to 10:7.

4. An article as defined in claim 3 in the form of a wet-laid paper in which the poly-cationic compound is selected from the water-soluble linear polymers, and their quaternaries, of at least 10 mole percent of monomeric units having the formula

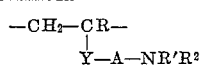

where
R is selected from the group consisting of H and $CH_3$,
Y is selected from the group consisting of O, COO, and CONH,
A is selected from the group consisting of $-C_2H_4-$, $-(CH_2)_3-$, and $-CH_2CH(CH_3)-$,
R' is selected from the group consisting of H, $CH_3$ and $C_2H_5$, and
$R^2$ is selected from the group consisting of H, $CH_3$, and $C_2H_5$.

5. An article as defined in claim 3 in the form of a wet-laid paper in which the poly-cationic compound is selected from the water-soluble linear polymers, and their quaternaries, of at least 50 mole percent of dimethylaminoethyl methacrylate and having a molecular weight of at least about 100,000.

6. An article as defined in claim 3 in the form of a wet-laid paper in which the condensate is the product of ethylene oxide on a copolymer of 50 mole percent of ethyl acrylate and 50 mole percent of methacrylic acid.

7. An article as defined in claim 3 in the form of a wet-laid paper in which the condensate is the product of propylene oxide on polyacrylic acid.

8. An article as defined in claim 3 in the form of a wet-laid paper in which the condensate is the product of propylene oxide on polymethacrylic acid.

9. An article as defined in claim 3 in the form of a wet-laid paper in which the condensate is a copolymer of 40 mole percent of methyl methacrylate with 60 mole percent of methacrylic acid.

10. An article as defined in claim 3 in the form of a wet-laid paper in which the condensate is a copolymer of 25 mole percent of methyl acrylate with 75 mole percent of acrylic acid.

11. A process for producing fibrous products comprising treating cellulosic fibers in an aqueous suspension thereof with a water-soluble poly-cationic substance selected from the group consisting of sub-resinous to resinous condensation products of, and polymers of, an organic nitrogen compound and then with a water-soluble condensate of a polymer of monoethylenically unsaturated monomeric molecules comprising at least 35 mole percent of an acid of the group consisting of acrylic acid, methacrylic acid, and itaconic acid with 1 mole percent to 250 mole percent of at least one alkylene oxide selected from ethylene oxide and propylene oxide.

12. A process for making paper as defined in claim 11 in which the amount of poly-cationic compound applied is from 0.2 to 2% on the weight of the fiber and the amount of the condensate is from 0.5 to 2% on the fiber weight.

13. A process as defined in claim 12 in which the cationic compound is selected from the water-soluble linear polymers, and their quaternaries, of at least 10 mole percent of monomeric units having the formula

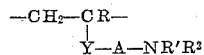

where

R is selected from the group consisting of H and CH$_3$,
Y is selected from the group consisting of O, COO, and CONH,
A is selected from the group consisting of —C$_2$H$_4$—, —(CH$_2$)$_3$—, and —CH$_2$CH(CH$_3$)—,
R' is selected from the group consisting of H, CH$_3$ and C$_2$H$_5$, and
R$^2$ is selected from the group consisting of H, CH$_3$, and C$_2$H$_5$.

14. A process as defined in claim 12 in which the polycationic compound is selected from the water-soluble linear polymers, and their quaternaries, of at least 50 mole percent of dimethylaminoethyl methacrylate and having a molecular weight of at least about 100,000.

15. A process as defined in claim 12 in which the condensate is the product of ethylene oxide on a copolymer of 50 mole percent of ethyl acrylate and 50 mole percent of methacrylic acid.

16. A process as defined in claim 12 in which the condensate is the product of propylene oxide on polyacrylic acid.

17. A process as defined in claim 12 in which the condensate is the product of proplyene oxide on polymethacrylic acid.

18. A process as defined in claim 12 in which the condensate is the product of propylene oxide on a copolymer of 40 mole percent of methyl methacrylate with 60 mole percent of methacrylic acid.

19. A process as defined in claim 12 in which the condensate is the product of propylene oxide on a copolymer of 25 mole percent of methyl acrylate with 75 mole percent of acrylic acid.

References Cited in the file of this patent

UNITED STATES PATENTS

| 2,601,597 | Daniel et al. | June 24, 1952 |
| 2,607,761 | Seymour | Aug. 19, 1952 |

FOREIGN PATENTS

| 154,799 | Australia | Apr. 26, 1951 |